US008035329B2

(12) United States Patent
Koerber

(10) Patent No.: US 8,035,329 B2

(45) Date of Patent: Oct. 11, 2011

(54) APPARATUS FOR ACTUATING AN ELECTRICAL SWITCHING DEVICE

(75) Inventor: Franz-Josef Koerber, Altenstadt (DE)

(73) Assignee: ABB Technology AG, Zurich (CH)

( * ) Notice: Subject to any disclaimer, the term of this patent is extended or adjusted under 35 U.S.C. 154(b) by 100 days.

(21) Appl. No.: 10/568,751

(22) PCT Filed: Sep. 13, 2003

(86) PCT No.: PCT/EP03/10199

§ 371 (c)(1), (2), (4) Date: Feb. 21, 2006

(87) PCT Pub. No.: WO2005/034156

PCT Pub. Date: Apr. 14, 2005

(65) Prior Publication Data

US 2006/0220470 A1 Oct. 5, 2006

(51) Int. Cl.
*G05B 11/32* (2006.01)

(52) U.S. Cl. ......... 318/625; 318/560; 307/112; 307/113

(58) Field of Classification Search .......... 318/560–650, 318/625; 335/14; 307/113, 112

See application file for complete search history.

(56) References Cited

U.S. PATENT DOCUMENTS 2,196,868 A 4/1940 Kramer
2,891,122 A 6/1959 Froland
3,769,478 A * 10/1973 Weston et al. .................. 218/12
4,066,922 A * 1/1978 Hennemann et al. ........... 310/80
4,131,776 A * 12/1978 Ehrenberger ................. 200/500
4,260,865 A * 4/1981 Horiuchi ....................... 200/320
4,595,806 A * 6/1986 Itoh ........................... 200/11 TC
4,623,859 A * 11/1986 Erickson et al. ................ 335/14
4,814,560 A 3/1989 Akesson
5,064,031 A * 11/1991 Kakizaki .................... 188/282.2
5,510,761 A * 4/1996 Boder et al. .................. 335/172
5,541,378 A 7/1996 Niklaus
5,576,523 A 11/1996 Meyer
5,584,383 A * 12/1996 Matsuo et al. ................ 200/400
5,595,287 A 1/1997 Niklaus
5,796,060 A * 8/1998 Fuchsle et al. .................. 218/79
5,856,643 A * 1/1999 Gress et al. ................ 200/50.32
6,060,669 A * 5/2000 Dohnal et al. ............ 200/11 TC
6,239,565 B1 * 5/2001 Alvaro et al. ................. 318/254

(Continued)

FOREIGN PATENT DOCUMENTS

CN 2307362 2/1999

(Continued)

OTHER PUBLICATIONS

*Guide du dessinateur industriel, Hackette technique, edition 1993-1994, double-p. 243.

(Continued)

*Primary Examiner* — Walter Benson
*Assistant Examiner* — David S Luo
(74) *Attorney, Agent, or Firm* — Buchanan Ingersoll & Rooney PC

(57) ABSTRACT

The invention relates to a device for actuating an electrical switchgear comprising at least one mobile contact point driven by a rotary shaft. According to the invention, an electric motor comprising a rotating drive shaft can be coupled to the rotary shaft by means of a transmission, in order to drive the same.

21 Claims, 2 Drawing Sheets

U.S. PATENT DOCUMENTS

| | | | | |
|---|---|---|---|---|
| 6,304,049 | B1 * | 10/2001 | Fournier et al. | 318/520 |
| 6,506,990 | B2 * | 1/2003 | Marin-Pache et al. | 200/400 |
| 6,693,247 | B1 * | 2/2004 | Byers et al. | 200/11 TC |
| 6,787,937 | B2 * | 9/2004 | Mody et al. | 307/115 |
| 6,841,962 | B2 * | 1/2005 | O'Connor et al. | 318/565 |

FOREIGN PATENT DOCUMENTS

| | | |
|---|---|---|
| DE | 605 927 | 11/1934 |
| DE | 852 568 | 7/1949 |
| DE | 1 142 026 | 1/1963 |
| DE | 26 10 321 | 9/1977 |
| DE | 26 15 259 | 10/1977 |
| DE | 30 03 713 | 1/1980 |
| DE | 689 14 607 | 7/1994 |
| DE | 195 04 714 A1 | 8/1996 |
| DE | 195 25 286 | 1/1997 |
| DE | 197 05 098 | 6/1998 |
| EP | 0 045 546 | 10/1984 |
| EP | 0 279 045 | 8/1988 |
| EP | 0 372 449 | 6/1990 |
| EP | 0 475 247 | 3/1992 |
| EP | 0 817 225 | 1/1998 |
| EP | 1 069 579 | 1/2001 |
| EP | 1 156 502 | 11/2001 |
| EP | 1 108 261 | 9/2002 |
| EP | 1 080 479 | 10/2002 |
| EP | 1 284 491 | 2/2003 |
| FR | 2.019.610 | 10/1969 |
| GB | 272498 | 11/1927 |
| GB | 808125 | 1/1959 |
| WO | 84/04424 | 11/1984 |
| WO | 99/60591 | 11/1999 |
| WO | 00/05735 | 2/2000 |

OTHER PUBLICATIONS

International Search Report dated Apr. 20, 2004.

* cited by examiner

APPARATUS FOR ACTUATING AN ELECTRICAL SWITCHING DEVICE

RELATED APPLICATIONS

This application claims priority under 35 U.S.C. §371 to PCT Application No. PCT/EP2003/010199, filed as an International Application on Sep. 13, 2003, designating the U.S., the entire contents of which is hereby incorporated by reference in its entirety.

BACKGROUND

The invention relates to an apparatus for actuating an electrical switching device, in particular a high-voltage power breaker, in accordance with the precharacterizing clause of claim 1.

The invention further relates to a switching device, in particular a high-voltage power breaker, having an actuating apparatus according to the invention.

RELATED ART

Conventional power breakers have a switching chamber having a fixed and a moving contact piece. The moving contact piece is in this case fixed to one end of an insulating rod, whose other end is connected to one end of an actuating lever. The other end of the actuating lever is fixed to a rotating shaft such that the moving contact piece is moved towards the fixed contact piece, or away from said fixed contact piece, owing to a rotation of the rotating shaft. The length of the actuating lever is dimensioned such that the power breaker is switched on or switched off owing to a rotation of the rotating shaft through a specific angle.

The rotating shaft is often set in rotation by means of a mechanical or hydromechanical stored-energy spring mechanism; the drive is coupled to one end of a connecting rod, which is connected to the rotating shaft of the power breaker via a further lever. A linear or approximately linear movement of the drive through a specific stroke in this case brings about a rotation of the rotating shaft through the predetermined angle and thus brings about a switching operation.

A mechanical or hydromechanical stored-energy spring mechanism of this type has an energy store, which is, for example, in the form of a mechanical spring energy store in the form of helical springs, spiral springs, torsion springs or plate springs. This spring energy store is stressed with the aid of a winding motor.

In order to carry out a switching operation, the spring energy store is relieved by releasing a latch, or by actuating a control valve, as a result of which the spring energy is transmitted onto the connecting rod via a gear mechanism, or via a hydraulic transmission medium, and thus the required stroke is exerted on the connecting rod.

Such stored-energy spring mechanisms have a comparatively complex design comprising many individual moving parts and have a comparatively high space requirement. Furthermore, such mechanically moving parts which are subject to friction in principle require regular maintenance and checks.

BRIEF SUMMARY

The invention is based on the object of providing an apparatus for actuating a switching device, which has a simple design with a lower space requirement and requires little maintenance. It is also the object of the invention to specify a corresponding switching device.

The object is achieved according to the invention by an actuating apparatus having the features specified in claim 1. Further advantageous refinements, and a corresponding switching device, are specified in the further claims.

According to the invention, an electric motor having a rotating drive shaft, which can be coupled to the rotating shaft of the switching device by means of a gear mechanism, is provided for the purpose of driving a rotating shaft of an electrical switching device, in particular a high-voltage power breaker. In comparison to a mechanical or hydromechanical stored-energy spring mechanism, an electric motor has a comparatively simple design and has a lower space requirement. The complexity for its maintenance is also less than that for a stored-energy spring mechanism. The use of a gear mechanism means that the torque which is transmitted onto the rotating shaft of the switching device is greater than the torque which needs to be applied by the electric motor. The physical shape and thus also the space requirement can thus be further reduced compared to those of an electric motor which directly drives the rotating shaft.

In the case of multi-pole, in particular three-pole, switching devices, a motor is provided for the purpose of driving all of the switch poles.

As an alternative, in the case of multi-pole, in particular three-pole, switching devices, a separate electric motor can also be provided for the purpose of driving each switch pole.

The central axis of the drive shaft of the electric motor runs parallel to the central axis of the rotating shaft, for which reason the physical arrangement of the electric motor is not fixed by the position of the rotating shaft.

In one advantageous refinement of the invention, the electric motor is in the form of a servomotor. A servomotor has the advantage over other electric motors that, by corresponding driving, a comparatively precise rotation through a predetermined angle can be carried out. Furthermore, a servomotor, in particular during short-term operation, produces a comparatively high torque.

In accordance with one advantageous embodiment, the gear mechanism is in the form of a lever mechanism. Such a lever mechanism, which is also referred to as a four-membered rotary joint or as a rocker arm, is reliable and requires little maintenance.

The lever mechanism can advantageously be dimensioned such that a rotation of the drive shaft of the electric motor through 180° brings about a switching operation. It is also possible to dimension the lever mechanism such that a rotation of the drive shaft of the electric motor through less than 180°, for example 90°, brings about a switching operation. In such a case, however, the electric motor needs to apply a correspondingly higher torque. With a rotation through 180°, the torque to be applied by the electric motor is minimal.

In one advantageous development, an intermediate piece, which is preferably in the form of a circular disk, is fixed on the drive shaft of the electric motor, it being possible for that end of the connecting rod which faces the drive shaft to be connected to the intermediate piece at at least two distances from the central axis of the drive shaft. In this manner, the lever mechanism can be set to different output angles by fixing the connecting rod at a suitable distance from the central axis of the drive shaft.

In accordance with one alternative embodiment, the gear mechanism can be in the form of a toothed belt drive, which is likewise comparatively reliable and requires comparatively little maintenance.

The toothed belt drive advantageously has a transmission ratio of 1:1 to 1:6, preferably 1:3.5. For a switching operation which requires, for example, a rotation of the rotating shaft through 70°, the drive shaft of the electric motor will rotate through 70° to 420°, preferably 245°. A small rotation angle of the drive shaft requires a high torque of the electric motor, and a large rotation angle requires a high angular velocity. A mean value which is desired in practice is a rotation angle of approximately 245°, i.e. a gear transmission of 1:3.5.

Furthermore, a switching device, in particular a high-voltage power breaker, is claimed which has an actuating apparatus according to the invention. The actuating apparatus can also be applied to further high-voltage, medium-voltage and low-voltage switching devices, for example power breakers, disconnectors, grounding devices and load disconnectors.

The invention, advantageous refinements and improvements of the invention and further advantages will be explained and described in more detail with reference to the drawings, in which three exemplary embodiments of the invention are illustrated and in which:

BRIEF DESCRIPTION OF THE DRAWINGS

FIG. 1 shows an actuating apparatus according to the invention having a lever mechanism with the switching device switched off. A first lever 16 is fixed to a drive shaft 18 of an electric motor, transversely with respect to said drive shaft 18, and acts on a second lever 12 via a connecting rod 14, said second lever 12 being fixed to a rotating shaft 10 of a switching device, transversely with respect to said rotating shaft 10. An actuating lever 42 is also fixed to the rotating shaft 10 on the gas-chamber side, transversely with respect to said rotating shaft 10, and actuates a moving contact piece of a switching chamber 40 via an insulating rod 44. The switching chamber 40 is only illustrated symbolically.

Figure 1:
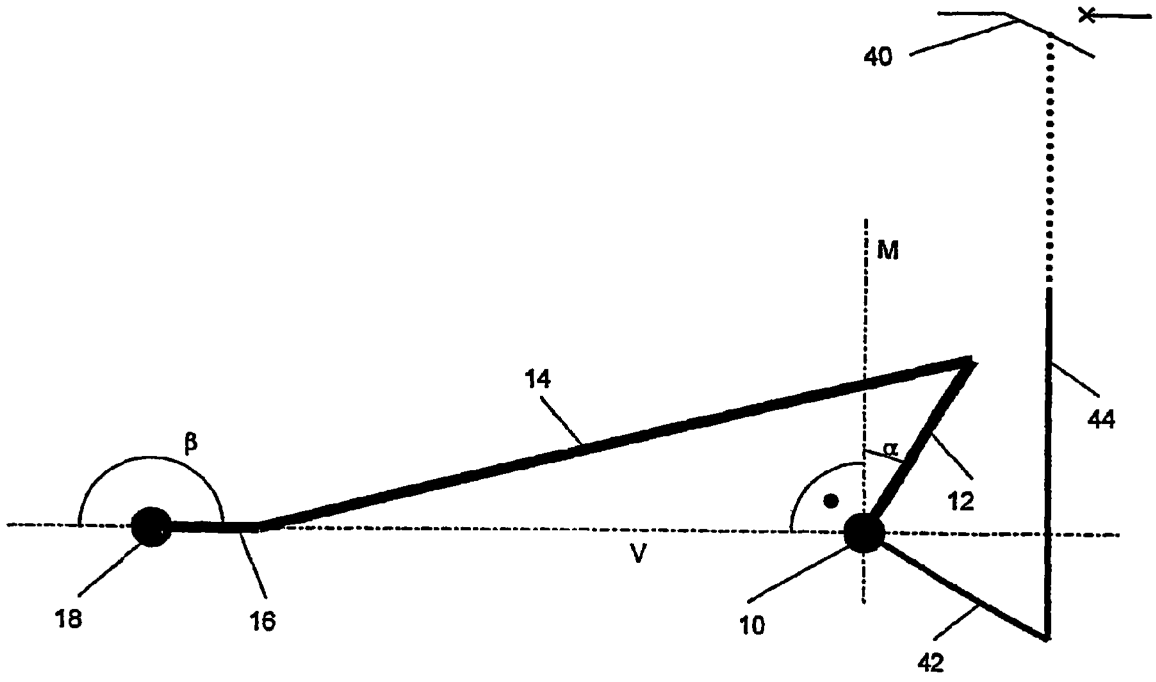
FIG. 1 shows an actuating apparatus according to the invention having a lever mechanism with the switching device switched off.

An imaginary connecting line V runs through the central axis of the drive shaft 18 and the central axis of the rotating shaft 10. An imaginary center line M intersects the connecting line V and the central axis of the rotating shaft 10 at right angles.

In the illustration shown here, in which the switching device is switched off, as can be seen from the symbol of the switching chamber 40, the second lever 12 is inclined with respect to the center line M through an acute angle α. In this case, that end of the second lever 12 which is connected to the connecting rod 14 is located on that side of the center line M which faces away from the drive shaft 18. The first lever 16 is aligned with the connecting line V, in which case its end connected to the connecting rod 14 points in the direction of the rotating shaft 10.

In order to switch the switching device on, the first lever 16 is rotated by the drive shaft 18 through an angle β, in this case 180°. During this rotation, the first lever 16, the connecting rod 14 and the second lever 12 are always located on the same side of the connecting line V.

Figure 2:
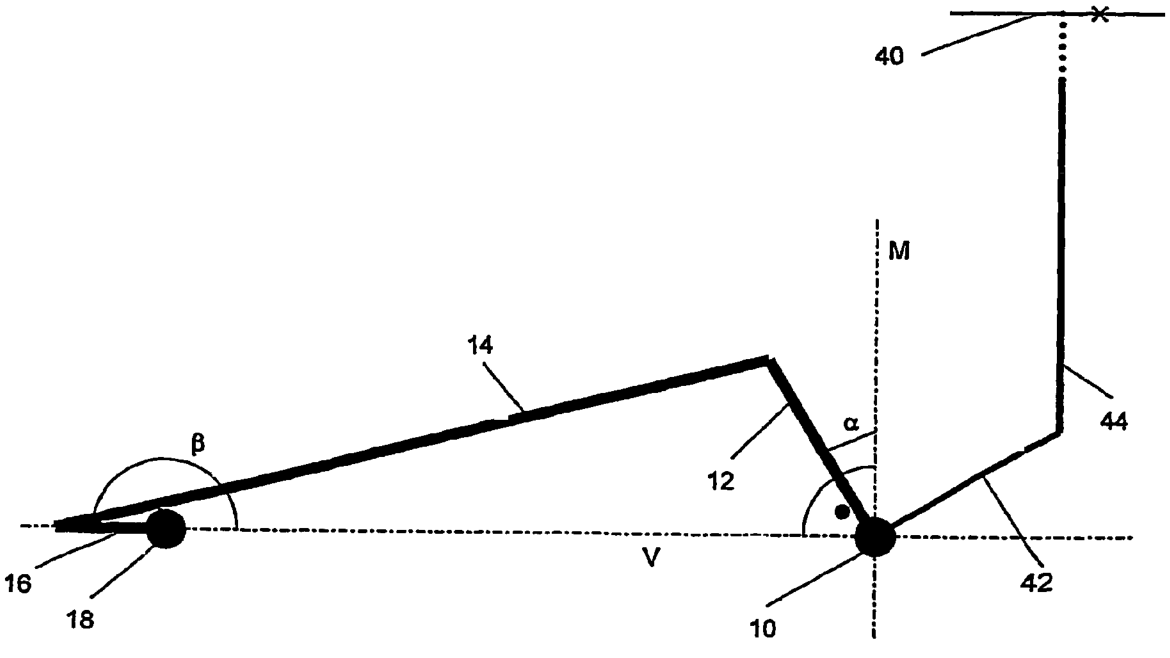
FIG. 2 shows an actuating apparatus according to the invention having a lever mechanism with the switching device switched on, FIG. 3 shows a circular disk having a plurality of attachment possibilities.

FIG. 2 shows the actuating apparatus from FIG. 1 with the switching device switched on, as can be seen from the symbol of the switching chamber 40. The first lever 16 is again aligned with the connecting line V, in which case, however, its end connected to the connecting rod 14 points away from the rotating shaft 10. The second lever 12 is again inclined towards the center line M through the angle α, in which case, however, its end connected to the connecting rod 14 is located on that side of the center line M which faces the drive shaft 18.

In order to switch the switching device off, the first lever 16 is rotated by the drive shaft 18 through the angle β, in this case 180°, in the opposite direction to that during switching-on.

A rotation of the first lever 16 through 180° thus brings about a rotation of the second lever through 2*α. The following is true for the dimensions of the lever mechanism:

L1=L2*sin(α), where L1 represents the length of the first lever 16, and L2 represents the length of the second lever 12. The length of the connecting rod 14 is to be selected to be greater than the length of the second lever 12.

Figure 3:
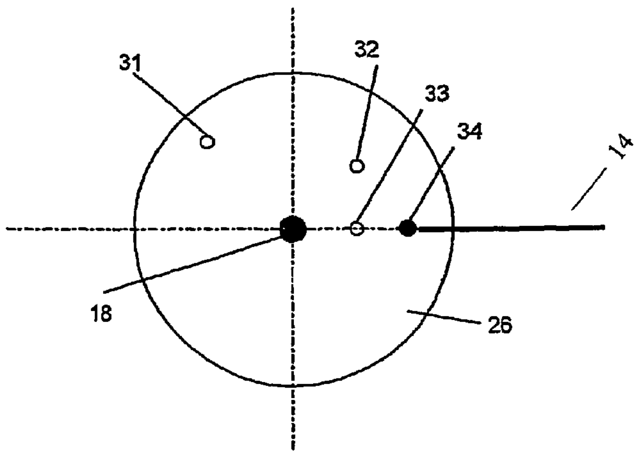

FIG. 3 shows an intermediate piece in the form of a circular disk 26 having a plurality of attachment possibilities for a connecting rod 14. The circular disk 26 is mounted on the drive shaft 18 of the electric motor, the central axes of the circular disk 26 and the drive shaft 18 being aligned with one another. The circular disk 26 in this case has four holes 31, 32, 33 and 34, which are each fitted at a different radial distance from the central axis of the circular disk 26 and act as attachment possibilities for the connecting rod 14. The connecting rod 14 likewise has, for example, a hole such that the circular disk 26 and the connecting rod 14 can be connected with the aid of a bolt.

The radial distance of the hole 31, 32, 33 or 34, with which the connecting rod 14 is connected, from the central axis of the drive shaft 18 corresponds to the length L1 of the first lever 16 in FIG. 1 and FIG. 2. By the selection of the corresponding hole 31, 32, 33 or 34 for connection to the connecting rod 14, it is thus possible to adapt the lever mechanism to different lengths L2 of the second lever 12 and/or different rotation angles α of the rotating shaft 10. The circular disk is in this case to be aligned such that the hole 31, 32, 33 or 34, with which the connecting rod 14 is connected, lies on the connecting line V and points towards the rotating shaft 10 when the switching device is switched off.

The arrangement of the holes on the circular disk is freely selectable, as is illustrated by way of example by the arrangement of a first hole 31 and a second hole 32. A third hole 33 and a fourth hole 34 are arranged, for example, such that their center points are aligned with the central axis of the drive shaft 18.

The configuration of the intermediate piece is not restricted to the shape described here as a circular disk, rather the intermediate piece may be in the form of, for example, a circle segment, an oval, a rod, a triangle, a rectangle or another shape.

Figure 4:
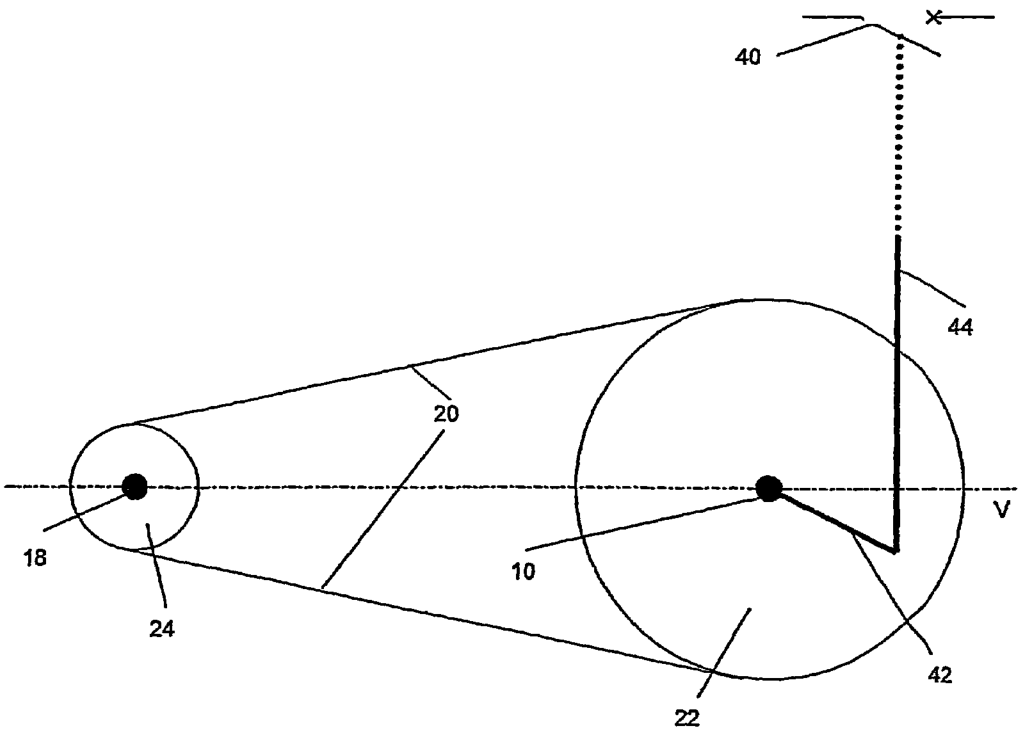
FIG. 4 shows an actuating apparatus according to the invention having a toothed belt drive.

FIG. 4 shows an actuating apparatus according to the invention having a toothed belt drive. A first belt pulley 24 is mounted on the drive shaft 18 of the electric motor, and a second belt pulley 22 on the rotating shaft 10 of the switching device. A toothed belt 20 is stretched around the belt pulleys 22 and 24. An actuating lever 42 is also fixed to the rotating shaft 10, transversely with respect to said rotating shaft 10, and actuates a moving contact piece of a switching chamber 40 via an insulating rod 44. The switching chamber 40 is only illustrated symbolically.

The transmission ratio of the toothed belt drive is given as a quotient of the radius of the first belt pulley 24 and the radius of the second belt pulley 22. If the transmission ratio is 1:3, a switching operation in which the rotating shaft 10 is to be rotated through, for example, 70°, takes place owing to a rotation of the drive shaft 18 through 210°.

LIST OF REFERENCES

10: rotating shaft
12: second lever
14: connecting rod
16: first lever
18: drive shaft
20: toothed belt
22: second belt pulley
24: first belt pulley
26: circular disk
31: first hole
32: second hole
33: third hole
34: fourth hole
40: switching chamber
42: actuating lever
44: insulating rod
$\alpha$: rotation angle of the rotating shaft
$\beta$: rotation angle of the drive shaft
M: center line
V: connecting line

The invention claimed is:

1. An actuating apparatus comprising:

an electrical switching device high-voltage power breaker having at least one moving contact piece, the at least one moving contact piece being driven via a rotating shaft that rotates about a first axis;

an electric motor having a rotating drive shaft that rotates about a second axis, which is coupled to the rotating shaft of the switching device through a gear mechanism, wherein the drive shaft of the electric motor drives the rotating shaft to switch the switching device high-voltage power breaker on and off, wherein the first axis of the drive shaft runs parallel to the second axis of the rotating shaft in a common horizontal plane, and wherein the gear mechanism is a lever mechanism connected to the rotating shaft and the drive shaft.

2. The apparatus as claimed in claim 1, wherein, in the case of multi-pole, switching devices, an electric motor is provided for the purpose of driving all of the switch poles.

3. The apparatus as claimed in claim 2, wherein the gear mechanism is in the form of a toothed belt drive.

4. The apparatus as claimed in claim 3, wherein the toothed belt drive has a transmission ratio of 1:1 to 1:6.

5. A switching device having at least one apparatus for actuating purposes as claimed in claim 4.

6. The apparatus as claimed in claim 3, wherein the toothed belt drive has a transmission ratio of 1:3.5.

7. The apparatus as claimed in claim 1, wherein, in the case of multi-pole, switching devices, a separate electric motor is provided for the purpose of driving each switch pole.

8. The apparatus as claimed in claim 1, wherein the first axis of the drive shaft runs parallel to the second axis of the rotating shaft.

9. The apparatus as claimed in claim 1, wherein the electric motor is a servomotor.

10. The apparatus as claimed in claim 1, wherein the lever mechanism is dimensioned such that a rotation of the drive shaft of the electric motor through at most 180° brings about a switching operation of the switching device.

11. The apparatus as claimed in claim 1, wherein an intermediate piece, configured as a circular disk, is fixed to the drive shaft of the electric motor, and wherein an end of a connecting rod which faces the drive shaft is connected to said intermediate piece at one of at least two distances from the first axis of the drive shaft.

12. The apparatus as claimed in claim 1, wherein the gear mechanism is in the form of a toothed belt drive.

13. The apparatus as claimed in claim 12, wherein the toothed belt drive has a transmission ratio of 1:1 to 1:6.

14. The apparatus as claimed in claim 12, wherein the toothed belt drive has a transmission ratio of 1:3.5.

15. A switching device having at least one apparatus for actuating purposes as claimed in claim 1.

16. The apparatus as claimed in claim 1, wherein the electric motor is a servomotor.

17. The apparatus as claimed in claim 16, wherein the gear mechanism is a lever mechanism.

18. The apparatus as claimed in claim 17, wherein the lever mechanism is dimensioned such that a rotation of the drive shaft of the electric motor through at most 180° brings about a switching operation of the switching device.

19. The apparatus as claimed in claim 18, wherein an intermediate piece configured as a circular disk, is fixed to the drive shaft of the electric motor, and wherein an end of a connecting rod which faces the drive shaft is connected to said intermediate piece at one of at least two distances from the first axis of the drive shaft.

20. A switching device having at least one apparatus for actuating purposes as claimed in claim 19.

21. The apparatus of claim 1, wherein the lever mechanism has one end fixed to the drive shaft of the electric motor and another end fixed to the rotating shaft of the switching device.

* * * * *